US011138898B2

(12) United States Patent
Lee (10) Patent No.: US 11,138,898 B2
(45) Date of Patent: Oct. 5, 2021

(54) DEVICE AND METHOD FOR PROVIDING STUDYING OF INCORRECTLY ANSWERED QUESTION

(71) Applicant: Jong-Ho Lee, Seoul (KR)

(72) Inventor: Jong-Ho Lee, Seoul (KR)

( * ) Notice: Subject to any disclaimer, the term of this patent is extended or adjusted under 35 U.S.C. 154(b) by 331 days.

(21) Appl. No.: 16/342,248

(22) PCT Filed: Oct. 13, 2017

(86) PCT No.: PCT/KR2017/011344
§ 371 (c)(1),
(2) Date: Apr. 16, 2019

(87) PCT Pub. No.: WO2018/080064
PCT Pub. Date: May 3, 2018

(65) Prior Publication Data
US 2019/0251857 A1  Aug. 15, 2019

(30) Foreign Application Priority Data

Oct. 25, 2016  (KR) .......................... 10-2016-0139361
Nov. 17, 2016  (KR) .......................... 10-2016-0153500

(51) Int. Cl.
*G09B 7/08* (2006.01)
*G09B 7/073* (2006.01)
(Continued)

(52) U.S. Cl.
CPC ................ *G09B 7/08* (2013.01); *G06F 9/44* (2013.01); *G06F 16/3341* (2019.01);
(Continued)

(58) Field of Classification Search
None
See application file for complete search history.

(56) References Cited

U.S. PATENT DOCUMENTS 8,850,537 B1 * 9/2014 Dotan ..................... G06F 21/46
726/6
2004/0234936 A1 * 11/2004 Ullman ................... G09B 7/02
434/322
(Continued)

FOREIGN PATENT DOCUMENTS

KR  10-2003-0053415 A   6/2003
KR     10-0786352 B1  12/2007
(Continued)

*Primary Examiner* — Justin S Lee
(74) *Attorney, Agent, or Firm* — Studebaker & Brackett PC (57) ABSTRACT

Disclosed are a device and method for providing a checking question designed to allow a user to perform the checking study of correct answers or incorrect answers by using the choices of one or more incorrectly answered questions. The device includes: an incorrectly answered question selection unit which selects one or more questions incorrectly answered by a user from among questions provided to the user; a choice extraction unit which extracts correct answers as choices for the respective selected incorrectly answered questions; a checking question generation unit which generates one or more checking questions designed to allow the user to study the incorrectly answered questions by allocating the extracted choices so that the extracted choices become the choices of the checking questions; and a checking study provision unit which provides the study of the incorrectly answered questions by transmitting the generated checking questions to a user terminal.

12 Claims, 6 Drawing Sheets

(51) Int. Cl.
*G06F 16/33* (2019.01)
*G06Q 50/20* (2012.01)
*G09B 7/06* (2006.01)
*G09B 7/02* (2006.01)
*G06F 9/44* (2018.01)

(52) U.S. Cl.
CPC ......... *G06Q 50/20* (2013.01); *G06Q 50/2057* (2013.01); *G09B 7/02* (2013.01); *G09B 7/06* (2013.01); *G09B 7/073* (2013.01)

(56) References Cited

U.S. PATENT DOCUMENTS

| | | | | |
|---|---|---|---|---|
| 2011/0165550 | A1* | 7/2011 | Jang | G06Q 50/20 434/362 |
| 2013/0236875 | A1* | 9/2013 | Hou | G09B 7/06 434/322 |
| 2015/0199400 | A1* | 7/2015 | Wu | G06F 40/211 434/353 |
| 2015/0310753 | A1* | 10/2015 | Faus | G06F 16/743 434/309 |
| 2017/0169717 | A1* | 6/2017 | Allen | G09B 7/08 |

FOREIGN PATENT DOCUMENTS

| | | |
|---|---|---|
| KR | 10-2012-0092421 A | 8/2012 |
| KR | 10-2014-0011231 A | 1/2014 |
| KR | 10-2015-0031521 A | 3/2015 |
| KR | 10-2015-0108503 A | 9/2015 |

\* cited by examiner

```
T-type question : Which of the
following is true?
F-type question : Which of the
following is false (not true) ?

T-type choice : The capital of the
Republic of Korea is Seoul.
F-type choice : The capital of the
Republic of Korea is Busan.
```

FIG. 3

```
Question 1) Which of the following is true?
a. The capital of the Republic of Korea is Seoul.
b. The capital of the United States is New York.
c. The capital of China is Shanghai.
d. The capital of Japan is Oosaka.
Question 2) Which of the following is true?
a. Tiger Woods is a soccer player.
b. Lionel Messi is a soccer player.
c. Lebron James is a soccer player.
d. Usain Bolt is a soccer player.
Question 3) Which of the following is true?
a. Japan belongs to the European Continent.
b. China belongs to the American Continent.
c. The Republic of Korea belongs to the Asian
Continent.
d. The United States belongs to the African Continent.
Question 4) Which of the following is true?
a. Mars is closer to the Sun than Earth.
b. Jupiter is closer to the Sun than Earth.
c. Saturn is closer to the Sun than Earth.
d. Venus is closer to the Sun than Earth.
==============================================
 Answers of the user : 1)b, 2)a 3)d, 4)c
```

FIG. 4

- Extraction of correct answer (T-type) choices
The capital of the Republic of Korea is Seoul.
Lionel Messi is a soccer player.
The Republic of Korea belongs to the Asian Continent.
Venus is closer to the Sun than Earth.

- Extraction of incorrect answer (F-type) choices
The capital of the United States is New York.
Tiger Woods is a soccer player.
The United States belongs to the African Continent.
Saturn is closer to the Sun than Earth.

FIG. 5

- Correct answer checking study : T-type question,
Correct answer d, Determined
Checking 1) Which of the following is true?
a. The capital of the Republic of Korea is Busan.
b. The Republic of Korea does not belong to the Asian Continent, but belongs to the American Continent.
c. Lionel Messi is not a soccer player.
d. Venus is closer to the Sun than Earth.

FIG. 6

- Incorrect answer checking study : F-type question,
Correct answer c, Determined
Checking 1) Which of the following is false?
a. Tiger Woods is a golf player.
b. The capital of the United States is Washington, D.C.
c. Saturn is closer to the Sun than Earth.
d. The United States belongs to the American Continent.

DEVICE AND METHOD FOR PROVIDING STUDYING OF INCORRECTLY ANSWERED QUESTION

TECHNICAL FIELD

The present application claims priorities based on Korean Patent Application No. 2016-0139361 filed on Oct. 25, 2016 and Korean Patent Application No. 2016-0153500 filed on Nov. 17, 2016, and the disclosures of the specifications and drawings of the corresponding applications are incorporated herein by reference in their entirety.

The present invention relates to study provision technology, and more specifically to a device and method that generate a question having the correct answer of an incorrectly answered question as a choice and provide the generated question as a question for the study of the incorrectly answered question.

BACKGROUND ART

A user identifies what he or she knows and does not know through question-solving study. In this case, the user skips a correctly answered question, but needs to check an incorrectly answered question, thereby preventing himself or herself from incorrectly answering the question next time. Incorrect answer study refers to the study of a question incorrectly answered by the user. During incorrect answer study, the user studies why an incorrect answer was selected and why a correct answer was not selected. Accordingly, the user studies why an incorrect answer selected by him or her is an incorrect answer and why a correct answer not selected by him or her is a correct answer.

Many educators emphasize the importance of incorrect answer study in self-directed study. The reason for this is that incorrect answer study is a procedure in which a user tests his or her study level and ability through question-solving study and checks one or more incorrectly answered questions for incorrect answers and correct answers based on the results of the study, thereby completing the ability of study of the user. In practice, the ability completed by incorrect answer study is exhibited as a result of a final examination.

DISCLOSURE

Technical Problem

The present invention has been conceived under the recognition of the above-described conventional technology, and an object of the present invention is to provide a device and method that extract correct answers and incorrect answers from questions incorrectly answered by a learner, generate a minimum number of questions having the extracted correct answers or incorrect answers as their choices, and provide the generated questions as questions for the study of the incorrectly answered questions.

Technical Solution

According to an aspect of the present invention, there is provided a device including: an incorrectly answered question selection unit which selects one or more questions incorrectly answered by a user from among questions provided to the user; a choice extraction unit which extracts correct answers as choices for the respective selected incorrectly answered questions; a checking question generation unit which generates one or more checking questions designed to allow the user to study the incorrectly answered questions by allocating the extracted choices so that the extracted choices become the choices of the checking questions; and a checking study provision unit which provides the study of the incorrectly answered questions by transmitting the generated checking questions to a user terminal.

The choice extraction unit may extract incorrect answers, selected by the user, or incorrect answers and correct answers as the choices for the respective incorrectly answered questions; and the checking question generation unit may generate the checking questions including the extracted choices.

The choice extraction unit may determine correct answers or incorrect answers of extraction targets for the respective incorrectly answered questions, and may extract the determined answers as the choices; and the checking question generation unit may generate the checking questions including the extracted choices.

The device may further include: a number-of-questions determination unit which determines the number of questions of the checking study by dividing the total number of extracted choices by the number of choices of each question; and the checking question generation unit may allocate choices, randomly selected from among the extracted choices, to each of a number of questions equal to the determined number of questions.

The questions may include one or more T-type questions each having a T (True)-type choice as a correct answer and one or more F-type questions each having an F (False)-type choice as a correct answer.

The device may further include a database (DB) which stores a T-type choice and one or more F-type choices for each of choices.

The checking question generation unit may determine whether each of the questions is of a T-type or F-type and a correct answer number whenever the question is generated; if it is determined that the question is of a T-type, may generate each of the checking questions by allocating a T-type choice to a choice corresponding to the correct answer number and allocating F-type choices to remaining choices; and, if it is determined that the question is of an F-type, may generate each of the checking questions by allocating an F-type choice to a choice corresponding to the correct answer number and allocating T-type choices to remaining choices.

According to another aspect of the present invention, there is provided a method that is performed by a device for providing studying of an incorrectly answered question, the method including: selecting one or more questions incorrectly answered by a user from among questions provided to the user; extracting correct answers as choices for the respective selected incorrectly answered questions; generating one or more checking questions designed to allow the user to study the incorrectly answered questions by allocating the extracted choices so that the extracted choices become the choices of the checking questions; and providing the study of the incorrectly answered questions by transmitting the generated checking questions to a user terminal.

Advantageous Effects

According to one aspect of the present invention, at least one checking question having the correct answers or incorrect answers of one or more incorrectly answered questions as its choice is generated and provided to a learner, and thus the learner can study a number of incorrectly answered questions equal to the number of choices by means of the single checking question, thereby enabling the learner to study all the incorrectly answered questions by means of a minimum number of checking questions.

Furthermore, according to another aspect of the present invention, in order to study one or more incorrectly answered questions, a learner may accurately study the correct answers and incorrect answers of the incorrectly answered questions by solving a minimum number of questions for checking study without studying study content.

DESCRIPTION OF DRAWINGS

The following drawings attached to the present specification illustrate preferred embodiments of the present invention, and function to help the further understanding of the technical spirit of the present invention in association with the following detailed description of the invention. Accordingly, the present invention should not be interpreted as being limited to the illustrations shown in the drawings.

MODE FOR INVENTION

Preferred embodiments of the present invention will be described in detail below with reference to the accompanying drawings. Prior to the detailed description, it should be noted that the terms or words used in the present specification and the attached claims should not be interpreted as being limited to common or dictionary meanings and should be interpreted as having meaning or concepts suitable for technical spirit of the present invention based on the principle that an inventor may appropriately define the concepts of terms in order to describe his or her invention in the best way. Accordingly, the embodiments described in the present specification and the configurations shown in the drawings merely correspond to embodiments of the present invention and do not encompass the overall technical spirit of the present invention, with the result that it should be appreciated that there may be various equivalents and modifications that can replace the embodiments and the configurations at the time at which the present application is filed.

Figure 1:
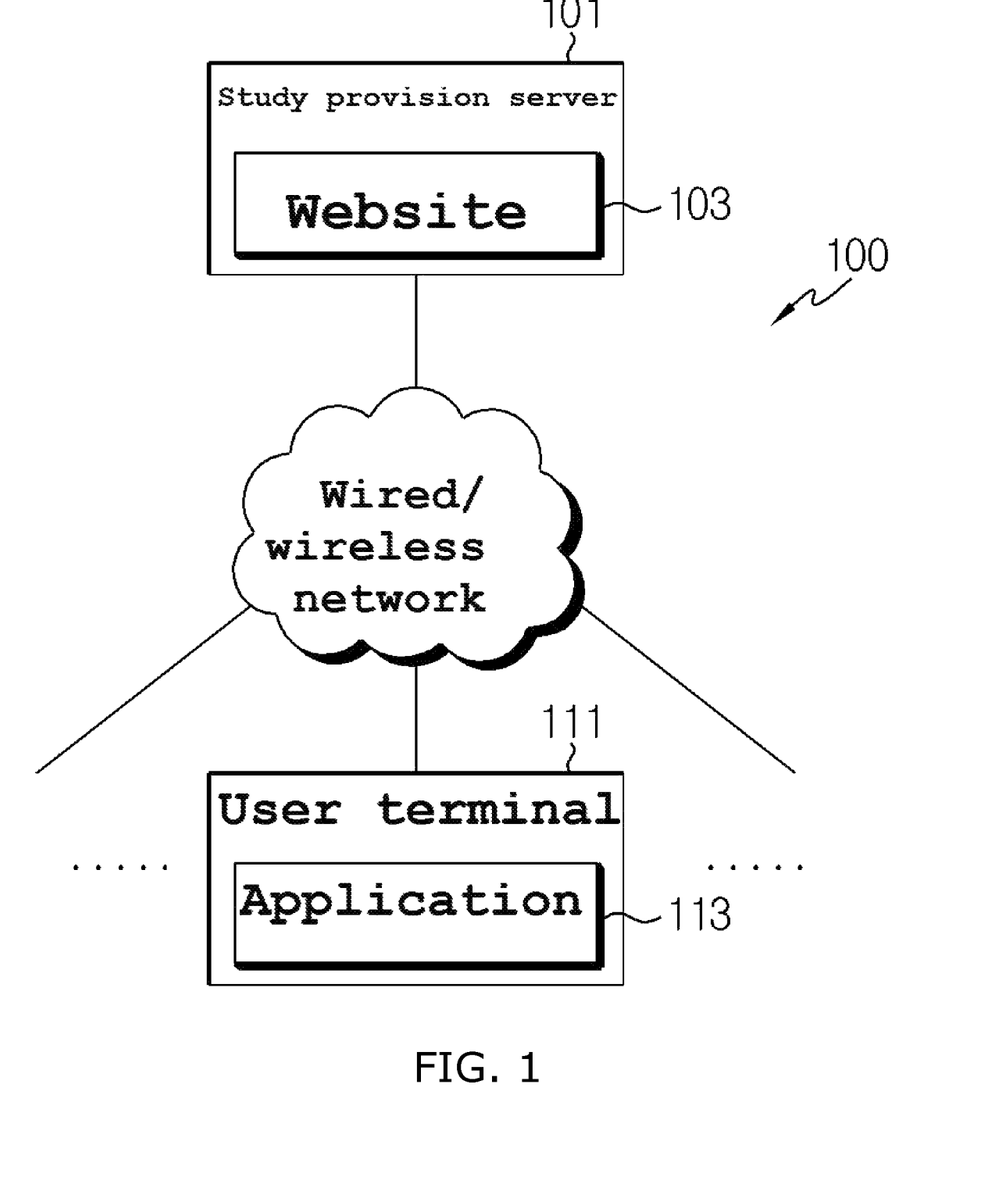
FIG. 1 is a view showing the schematic configuration of a system according to an embodiment of the present invention.

FIG. 1 is a view showing the schematic configuration of a system 1 according to an embodiment of the present invention.

The system 1 according to the embodiment of the present invention is configured to include: a study provision server 101 which provides at least one checking question for one or more questions, incorrectly answered by a user, via a website 103; and a user terminal 111 which executes an application 113 configured to access the website 103 and to receive the checking question.

The study provision server 101 provides question-solving study and checking study via the website 103. In the present invention, the study is not limited to particular targets, including the curricula of elementary, middle and high schools and universities, various types of qualification tests, etc.

The question-solving study provided by the study provision server 101 allows a user to solve a plurality of multiple-choice questions by providing a plurality of multiple-choice questions to the application 113. In the case of a multiple-choice question, a number of choices (options) equal to the number of choices are provided, and the user selects a correct answer. For example, in the case of a four-choice question, the number of choices is 4, and a correct answer is selected from among four choices.

When the user completes question solving, the study provision server 101 performs grading, and provides study results to the user. When the user receives the study results, the checking study designed to check one or more questions incorrectly answered because the user did not select correct answers may be performed.

In this case, the study provision server 101 generates at least one checking question designed to enable the user to identify and study correct answers by using one or more questions incorrectly answered by the user, and provides checking study. The checking study designed to enable the user to naturally become aware of the correct answers of the incorrectly answered questions when the user solves the checking question that is received from the study provision server 101. This checking study provides the effect of the study by which a user becomes aware of the correct answers of one or more incorrectly answered questions while making incorrect answer notes.

The user terminal 111 installs and executes the application 113. The user terminal 111 is not limited to a specific terminal having a network communication function and an application execution function. For example, any of a computer terminal, a smart terminal, an IP TV, etc. corresponds to the user terminal 111.

In this case, the checking study that is provided by the system 1 may be constructed in the local environment of the user terminal 111. The processing and functionality of the study provision server 101 in the local environment are included in the application 113. For example, the application 113 reads one or more questions from a storage device (e.g., a hard drive, a USB drive, or the like), and provides question-solving study to the user. When the user having received question-solving study solves the questions, the application 113 generates at least one checking question by using one or more questions incorrectly answered by the user, and provides the generated checking question by way of checking study. In other words, the application 113 may provide the question-solving study and checking study of the present invention to the user in a stand-alone environment, not in a client/server environment. The following description will be given on the assumption that the system 1 is in a client/server environment.

Figure 2:
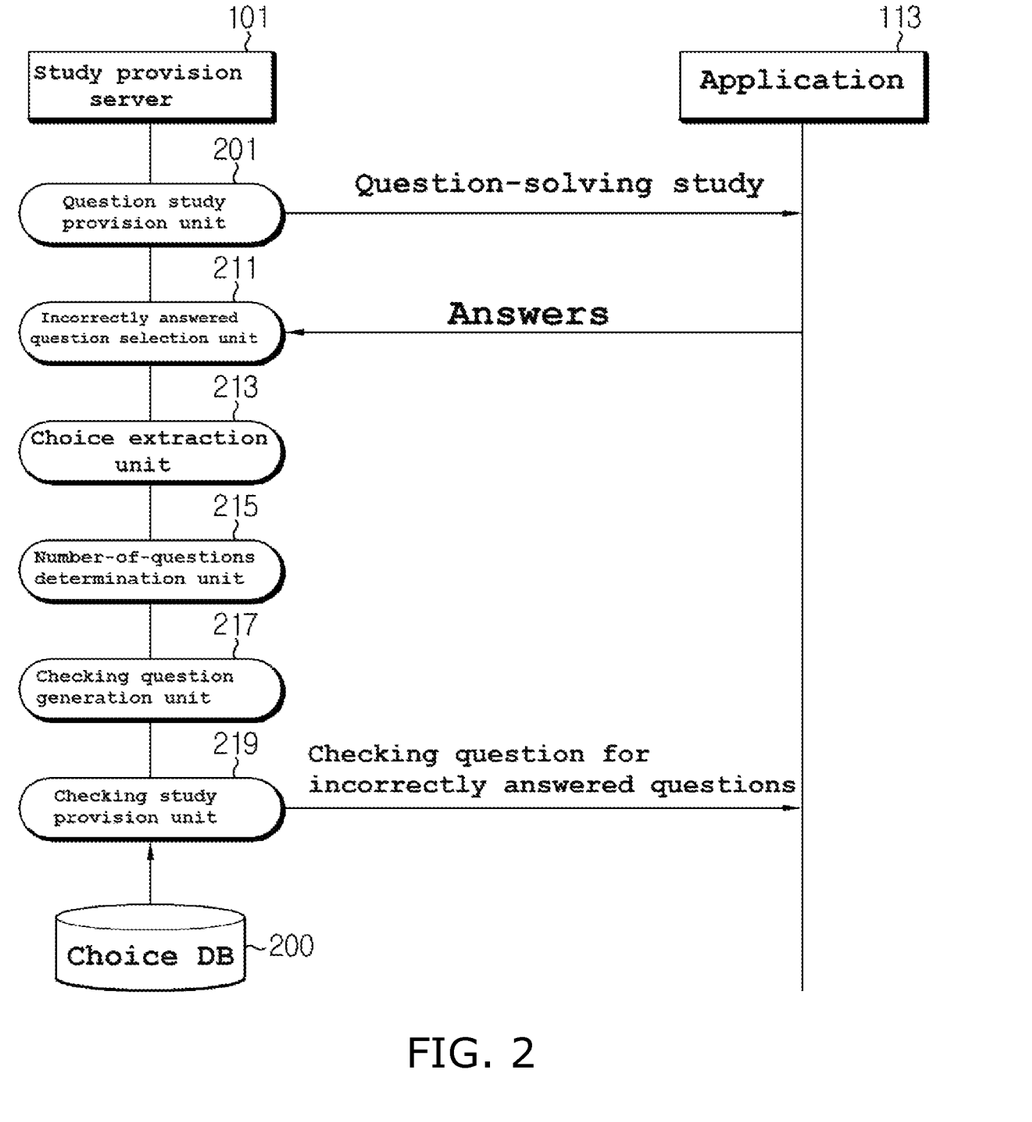
FIG. 2 is a view showing the schematic internal configuration of the study provision server shown in FIG. 1.
Figure 3:
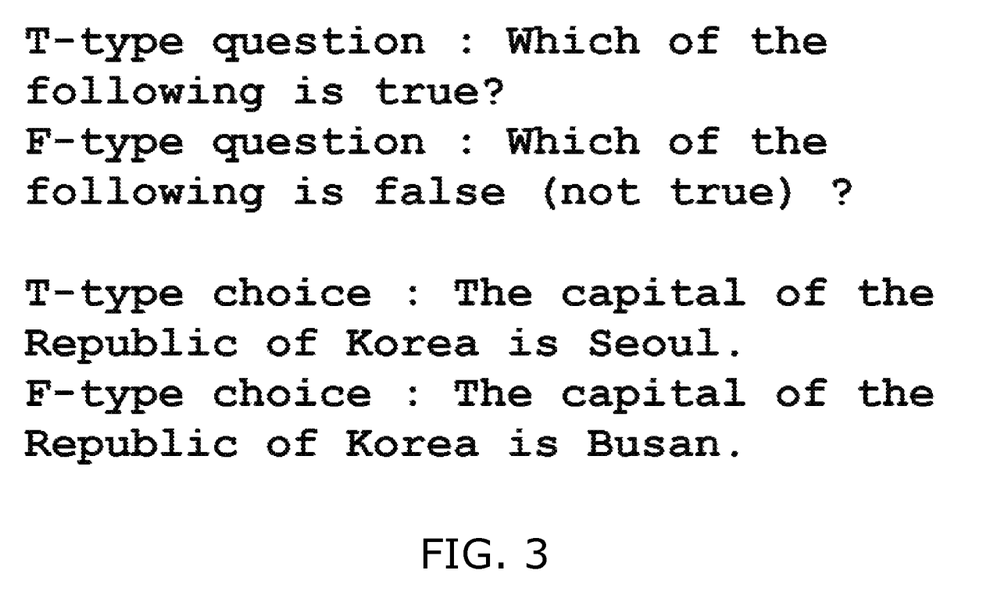
FIG. 3 is a view showing examples of T- and F-type questions and choices that are provided by the study provision server shown in FIG. 1.
Figure 4:
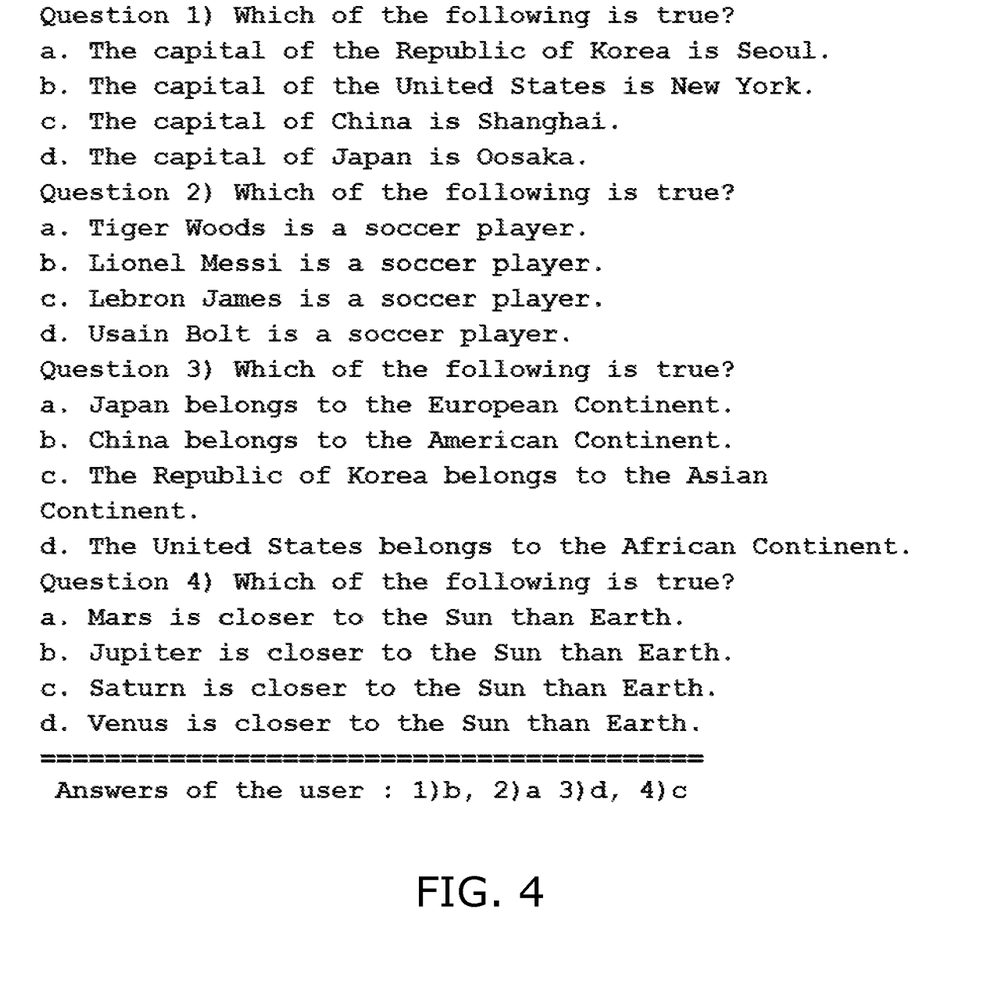
FIG. 4 is a view showing an example of question-solving study that is provided by the study provision server shown in FIG. 1.
Figure 5:
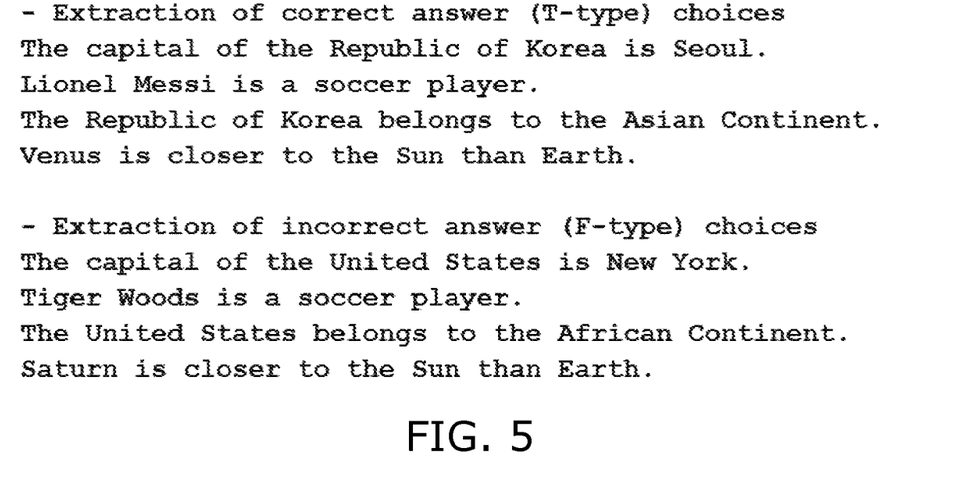
FIG. 5 is a view showing examples of the extraction of correct answer choices and the extraction of incorrect answer choices in the case of FIG. 4.
Figure 6:
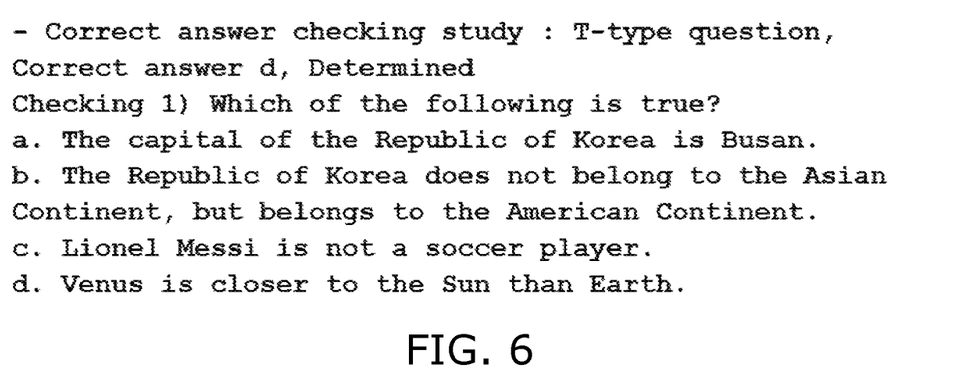
FIG. 6 is a view showing an example of a checking question using a correct answer choice in the case of FIG. 5.
Figure 7:
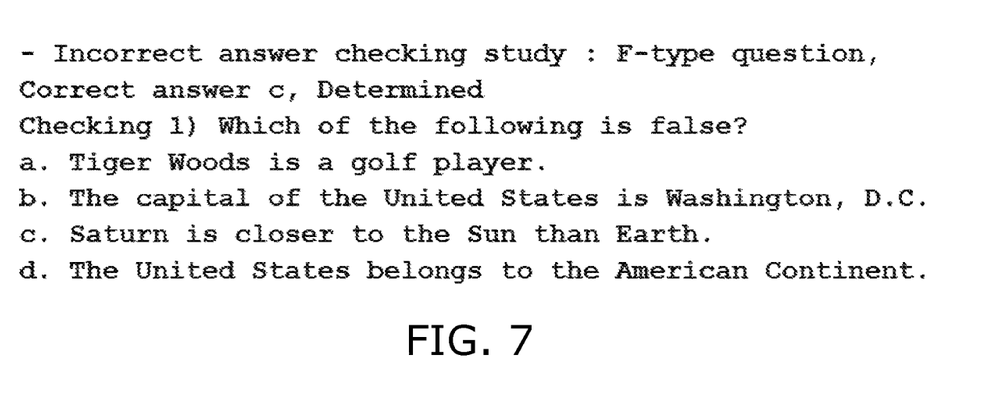
FIG. 7 is a view showing an example of a checking question using an incorrect answer choice in the case of FIG. 5.

FIG. 2 is a view showing the schematic internal configuration of the study provision server 101 shown in FIG. 1. FIG. 3 is a view showing examples of T- and F-type questions and choices that are provided by the study provision server 101 shown in FIG. 1. FIG. 4 is a view showing an example of question-solving study that is provided by the study provision server 101 shown in FIG. 1. FIG. 5 is a view showing examples of the extraction of correct answer choices and the extraction of incorrect answer choices in the case of FIG. 4. FIG. 6 is a view showing an example of a checking question using a correct answer choice in the case of FIG. 5. FIG. 7 is a view showing an example of a checking question using an incorrect answer choice in the case of FIG. 5. The following description will be given with reference to FIGS. 2 to 7.

The study provision server 101 may include memory, a memory controller, at least one processor (CPU), a peripheral interface, an input/output (I/O) subsystem, a display device, an input device, and a communication circuit. The memory may include high-speed random access memory, may include one or more pieces of nonvolatile memory, such as magnetic disk storage devices, and flash memory devices, or may include another nonvolatile semiconductor memory device. The access of other components, such as the processor and the peripheral interface, to the memory may be controlled by the memory controller. The memory may store various types of information and program instructions, and a program may be executed by the processor.

The peripheral interface connects the input and output peripheral devices of the study provision server 101 with the processor and the memory. The processor executes various software programs and/or instruction sets stored in the memory, performs various functions for the study provision server 101, and processes data. The I/O subsystem provides an interface between the input and output peripheral devices, such as a display device and an input device, and the peripheral interface. The display device may use liquid crystal display (LCD) technology or light emitting polymer display (LPD) technology.

The processor is a processor configured to perform operations associated with the study provision server 101 and execute instructions. For example, using instructions retrieved from the memory, the reception and manipulation of input and output data between the components of the study provision server 101 may be controlled. The communication circuit performs communication via an external port, or performs communication using an RF signal. The communication circuit converts an electrical signal into an RF signal or an RF signal into an electrical signal. Using this RF signal, communication with a communication network, another mobile gateway device, and a communication device may be performed.

Referring to FIG. 2, a study provision server 101 according to an embodiment of the present invention may be configured to include an incorrectly answered question selection unit 211, a choice extraction unit 213, a checking question generation unit 217, and a checking study provision unit 219. Furthermore, the study provision server 101 may further include a question study provision unit 201 and a number-of-questions determination unit 215. These components 201 to 219 may be implemented as software, stored in the memory, and executed by the processor, or may be implemented as the combination of software and hardware. For example, assuming that the study provision server 101 is a computer terminal including memory and a processor, the individual components 201 to 219 may be loaded into the memory in the form of programs, and may be executed by the processor.

The question study provision unit 201 provides question-solving study in response to a request from the application 113. When the question-solving study is provided, the application 113 receives questions, and a user solves the questions and selects correct answers thereto.

In connection with the question-solving study, the study provision server 101 may test the study level of the user, and may provide question-solving study having a difficulty level suitable for the study level of the user measured as a result of the test. Furthermore, the study provision server 101 may classify the indices, chapters, or the like of a study target, and may provide question-solving study for each of the classified ranges of the study target. When the user completes question solving, the question study provision unit 201 may receive the answers of the user from the application 113, may calculate scores by grading the answers, may rank the user, and may generate various types of statistics.

Referring to FIG. 3, the study provision server 101 may set questions in T- and F-type forms. A T-type question is a question that requires a user to select a T-type choice as a correct answer having true content. An F-type question is a question that requires a user to select an F-type choice as a correct answer having false content.

Furthermore, the study provision server 101 constructs a T-type choice and an F-type choice for individual choices constituting one question in connection with the same study content, and stores the T-type choice and the F-type choice in a choice DB 200. For example, in connection with the capital of the Republic of Korea, a T-type choice is "the capital of the Republic of Korea is Seoul," and an F-type choice is "the capital of the Republic of Korea is Busan." It is sufficient if an F-type choice is not a T-type, and thus the F-type choice may be constructed in more various forms. In other words, "the capital of the Republic of Korea is not Seoul" may be constructed as the F-type choice. Then, for each choice, the ratio of a T-type choice to F-type choices may be 1:N (N>=2).

Referring to FIG. 4, the question study provision unit 201 may set questions for a user by transmitting shown four questions to the application 113. In the case of "question 1," a T-type question is set, choice "a" is a T-type choice, and choices "b," "c" and "d" are F-type choices. Since "question 1" is a T-type question, choice "a," which is a T-type choice, is a correct answer. In this case, it is assumed that the user presents answers 1) b, 2) a, 3) d, and 4) c and the four questions are all incorrectly answered. "1) b" means that the user selects answer b for question 1.

The incorrectly answered question selection unit 211 selects only incorrectly answered questions from among the questions solved by the user. The selected incorrectly answered questions are study target questions that require the user to check the questions for correct answers. When the user does not select an answer or selects an incorrect answer for each question of solving study, the question is incorrectly answered. In the case of FIG. 4, since the user has incorrectly answered four questions, the four questions are selected as the incorrectly answered questions.

The choice extraction unit 213 extracts correct answers for the selected incorrectly answered questions. The extracted correct answers are a target for checking study, and the user is required to identify the correct answers. When the user studies why they are correct answers, incorrect answers may not be made in connection with the studied correct answers next time. Alternatively, the choice extraction unit 213 may extract an incorrect answer or a correct answer+an incorrect answer for each incorrectly answered question. Furthermore, it may be determined which of a correct answer and an incorrect answer will be extracted for each incorrectly answered question. A determined answer may be extracted. In other words, when an extracted answer is a correct answer, the correct answer will be studied. In contrast, when an extracted answer is an incorrect answer, the incorrect answer will be studied.

Referring to FIG. 5, the choice extraction unit 213 extracts correct answer choices, incorrect answer choices, or correct answer choices+incorrect answer choices. In other words, the choice extraction unit 213 may extract only correct answers, not selected by a user, as T-type choices. Alternatively, the choice extraction unit 213 may extract only incorrect answers, selected by a user, as F-type choices. Then, when correct answer choices are extracted, four correct answers are extracted. When incorrect answer choices are extracted, four incorrect answers are extracted. In contrast, when correct answer choices+incorrect answer choices are extracted, eight choices are extracted. It will be apparent that for incorrect answer study, three incorrect answers may be extracted for each question, and a total of 3×4=12 incorrect answers may be extracted.

For reference, the extraction of correct answer choices is designed to allow a user to actively study correct answers and to prevent the user from incorrectly answering the same questions as those shown in FIG. 4 when solving them next time. Meanwhile, the extraction of incorrect answer choices provides passive study designed to allow a user to study incorrect answers and to prevent the user from selecting incorrect answers when solving the same questions as those shown in FIG. 4 next time. It will be apparent that in the case where the correct answer choices and the incorrect answer choices are all studied, a user studies why the correct answer choices not selected by the user are correct answers for respective incorrectly answered questions and why the incorrect answer choices selected by the user are incorrect answers, and thus a study effect may be maximized.

The number-of-questions determination unit 215 determines the number of checking questions by using the number of choices (N) extracted from the incorrectly answered questions. The number-of-questions determination unit 215 is an optional component, and may be omitted. The minimum number of checking questions is determined by the equation shown in Table 1 below:

TABLE 1

The number of checking questions (n) = N/k (N: the number of extracted choices, and k: the number of choices for each question) = (nk+ remainder)/k the number of extracted choices (N) = n * k + remainder - if the remainder of N/k is equal to or larger than 1, the number of checking questions (n) = the number of checking questions (n) + 1

If a corresponding remainder is equal to or larger than 1 when the number of extracted choices (N) is divided by the number of choices (k) constituting each question, 1 is added to the number of checking questions (n) corresponding to a corresponding quotient. In the case where T-type choices are extracted as in FIG. 4, N is 4, the number of choices (k) of each question is 4, and a corresponding remainder is 0, so that the number of checking questions (n) is 1. In other words, the checking study of correct answers for four incorrectly answered questions is enabled through the checking study of a minimum of one question. As another example, assuming that N is 10, a corresponding quotient is 2 and a corresponding remainder is 2, so that the number of checking questions (n) is 3. In other words, when a user solves a minimum of three checking questions, the user may perform the checking study of ten incorrectly answered questions. In this case, when the number of checking questions (n) is obtained, the number-of-questions determination unit 215 may separate the extracted choices into groups of the numbers of checking questions (n), and may allocate the extracted choices to the individual groups. In the case where N is 10, four choices may be allocated to group 1, four choices may be allocated to group 2, and two choices may be allocated to group 3. Any one or more choices that belong to another group may be adopted as one or more choices that are required to meet the number of choices (k) of each question of each group. In other words, when a corresponding remainder is 2, the number of choices of group 3 is 2. In this case, two choices of another group may be adopted to meet the number of choices (k) of each question, i.e., 4. It will be apparent that in the case where a corresponding remainder is 2, the number of choices (k) of each question may be 2, other than 4, for only one specific question.

The checking question generation unit 217 generates checking questions by using the choices extracted by the choice extraction unit 213. First, the checking question generation unit 217 randomly determines question types and correct answer numbers. Thereafter, the checking question generation unit 217 generates a minimum number of checking questions by randomly allocating the extracted choices in accordance with question types and correct answer numbers determined as shown in FIGS. 6 and 7 at least once. In this case, in the case where a corresponding remainder is 2, two choices meeting the number of choices (k) of each question may be allocated twice.

In the case where the choice extraction unit 213 extracts correct answer-type choices, one checking question (k=4) may be generated for the four extracted correct answer choices. If incorrect answer-type choices are extracted, one checking question may be generated for the four extracted incorrect answer choices. It will be apparent that in the case where correct answer choices and incorrect answer choices are extracted, three checking questions are generated for the eight extracted correct answer and incorrect answer choices.

Referring to FIG. 6, the checking question generation unit 217 randomly determines a T-type question and a correct answer number d for the extracted correct answer-type choices. According to the determined T-type question, the selection of a true choice is the content of the question. Furthermore, the determined correct answer number is d. The checking question generation unit 217 randomly matches the four true-type choices, extracted in FIG. 5, with choice numbers a to d. The choice DB 200 is referred to for T-type choices matched with a, b and c exclusive of correct answer number d, and a checking question is generated by allocating the F-type choices. In other words, the extracted T-type choices are changed into F-type choices in the choices a, b and c.

Referring to FIG. 7, the checking question generation unit 217 randomly determines an F-type question and a correct answer number c for extracted incorrect answer-type choices. According to the determined F-type question, the selection of a false choice is the content of the question. Furthermore, the determined correct answer number is c. The checking question generation unit 217 randomly matches four incorrect answer-type choices, extracted in FIG. 5, with choice numbers a to d. The choice DB 200 is referred to for choices matched with a, b and c exclusive of correct answer number c, and a checking question is generated by allocating the T-type choices.

The checking study provision unit 219 provides generated checking questions to the application 113 in response to a request from the user. In the case where the number of choices (k) of each question is 4, a number of checking questions equal to about ¼ of the total number of incorrectly answered questions are provided to the user. The generation and provision of checking questions may continue until the user correctly answers checking questions.

Figure 8:
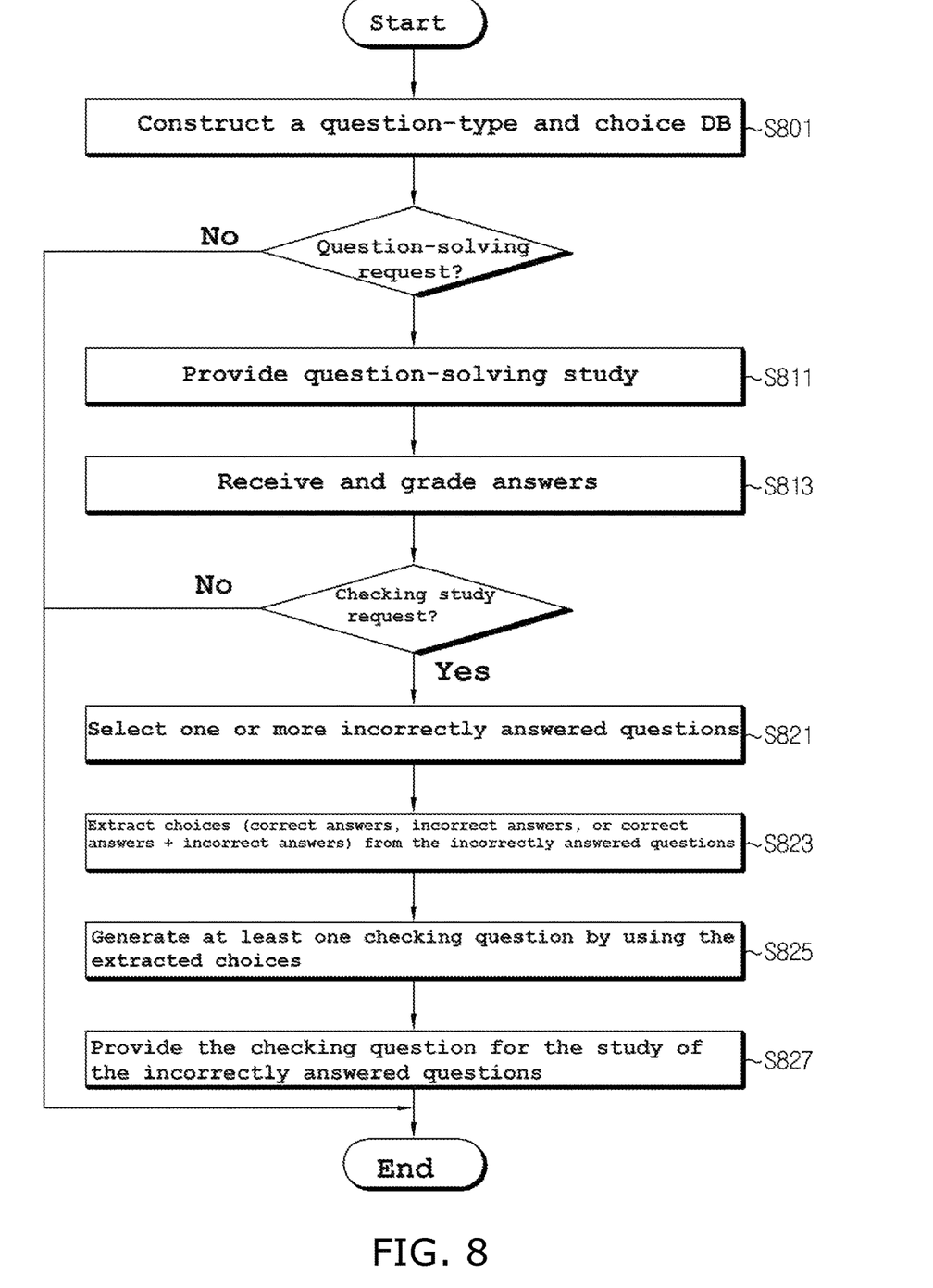
FIG. 8 is a schematic flowchart of a method of providing the studying of incorrectly answered questions according to an embodiment of the present invention.

FIG. 8 is a schematic flowchart of a method of providing the studying of incorrectly answered questions according to an embodiment of the present invention.

At step S801, the study provision server 101 receives the registrations of T-type or F-type choices for each of T-type and F-type questions, and stores the choices in the choice DB 200. Then, for one piece of study content, one T-type choice and one or more F-type choices are stored in the choice DB 200.

Thereafter, the application 113 accesses the website 103, and requests question-solving study from the study provision server 101. The study provision server 101 provides questions having corresponding study content to the application 113 in response to a request from a user at step S811. After question solving has been completed, the study provision server 101 receives the answers of the user from the application 113, grades the answers, and generates the results of the study at step S813. When the results of the question-solving study are generated, the user may request checking study designed to check one or more incorrectly answered questions.

When the checking study has been requested, the study provision server 101 selects one or more incorrectly answered questions of the user at step S821, and extracts choices for each of the selected incorrectly answered questions at step S823. In this case, the study provision server 101 may extract the correct answers (in the case of T-type questions) not selected by the user, the incorrect answers selected by the user, or the correct answers+the incorrect answers. For reference, when the choices are extracted, the minimum number of checking questions (n) is determined using the number of extracted choices (N) and the number of choices (k) of each question, and all the choices extracted for the individual checking questions may be grouped based on the number of choices (k) of each question.

When the choices are extracted, the study provision server 101 randomly determines a question type and a correct answer number for each checking question and the checking question is generated by allocating the extracted choices to the determined checking question at step S825. In this case, T-type or F-type choices are retrieved from the choice DB 200 in accordance with the determined question type and correct answer number. For reference, when the number of choices (k) of each question is 4, the study of four incorrectly answered questions may be performed by solving at least one checking question. When one or more checking questions are generated, the study provision server 101 provides the generated checking questions to the application 113 at step S827.

Although the present invention has been described in conjunction with the limited embodiments and drawings above, the present invention is not limited thereto. It will be apparent to those having ordinary knowledge in the art to which the present invention pertains that various modifications and alterations may be made without departing from the spirit of the present invention and a range equivalent to the following claims.

The invention claimed is:

1. A device comprising:
an incorrectly answered question selection unit which selects one or more questions incorrectly answered by a user from among questions provided to the user;
a choice extraction unit which extracts correct answers as choices for the respective selected incorrectly answered questions;
a number-of-questions determination unit which determines a number of questions of a checking study by dividing a total number of extracted choices by a number of choices of each question;
a checking question generation unit which generates one or more checking questions designed to allow the user to study the incorrectly answered questions by allocating the extracted choices so that the extracted choices become choices of the checking questions,
wherein the checking question generation unit allocates choices, randomly selected from among the extracted choices, to each of a number of questions equal to the determined number of questions; and
a checking study provision unit which provides study of the incorrectly answered questions by transmitting the generated checking questions to a user terminal.

2. The device of claim 1, wherein:
the choice extraction unit extracts incorrect answers, selected by the user, or incorrect answers and correct answers as the choices for the respective incorrectly answered questions; and
the checking question generation unit generates the checking questions including the extracted choices.

3. The device of claim 1, wherein:
the choice extraction unit determines correct answers or incorrect answers of extraction targets for the respective incorrectly answered questions, and extracts the determined answers as the choices; and
the checking question generation unit generates the checking questions including the extracted choices.

4. The device of claim 1, wherein the questions comprise one or more T-type questions each having a T (True)-type choice as a correct answer and one or more F-type questions each having an F (False)-type choice as a correct answer.

5. The device of claim 4, further comprising:
a database (DB) which stores a T-type choice and one or more F-type choices for each of choices.

6. The device of claim 5, wherein the checking question generation unit:
determines whether each of the questions is of a T-type or F-type and a correct answer number whenever the question is generated;
if it is determined that the question is of a T-type, generates each of the checking questions by allocating a T-type choice to a choice corresponding to the correct answer number and allocating F-type choices to remaining choices; and
if it is determined that the question is of an F-type, generates each of the checking questions by allocating an F-type choice to a choice corresponding to the correct answer number and allocating T-type choices to remaining choices.

7. A method that is performed by a device for providing studying of an incorrectly answered question, the method comprising:
selecting one or more questions incorrectly answered by a user from among questions provided to the user;
extracting correct answers as choices for the respective selected incorrectly answered questions;
determining a number of questions of a checking study by dividing a total number of extracted choices by a number of choices of each question;
generating one or more checking questions designed to allow the user to study the incorrectly answered questions by allocating the extracted choices so that the extracted choices become choices of the checking questions,
wherein the generating comprises allocating choices, randomly selected from among the extracted choices, to each of a number of questions equal to the determined number of questions; and
providing study of the incorrectly answered questions by transmitting the generated checking questions to a user terminal.

8. The method of claim 7, wherein:
the extracting comprises extracting incorrect answers, selected by the user, or incorrect answers and correct answers as the choices for the respective incorrectly answered questions; and
the generating comprises generating the checking questions including the extracted choices.

9. The method of claim 7, wherein:
the extracting comprises determining correct answers or incorrect answers of extraction targets for the respective incorrectly answered questions and extracting the determined answers as the choices; and
the generating comprises generating the checking questions including the extracted choices.

10. The method of claim 7, wherein the questions comprise one or more T-type questions each having a T (True)-type choice as a correct answer and one or more F-type questions each having an F (False)-type choice as a correct answer.

11. The method of claim 10, further comprising:
a database (DB) which stores a T-type choice and one or more F-type choices for each of choices.

12. The method of claim 11, wherein the generating comprises:
determining whether each of the questions is of a T-type or F-type and a correct answer number whenever the question is generated;
if it is determined that the question is of a T-type, generating each of the checking questions by allocating a T-type choice of the DB to a choice corresponding to the correct answer number and allocating F-type choices of the DB to remaining choices; and
if it is determined that the question is of an F-type, generating each of the checking questions by allocating an F-type choice of the DB to a choice corresponding to the correct answer number and allocating T-type choices of the DB to remaining choices.

* * * * *